United States Patent
Liston et al.

(10) Patent No.: US 6,923,303 B2
(45) Date of Patent: Aug. 2, 2005

(54) OVER-RUNNING CLUTCH PULLEY WITH CLUTCH AND BEARING LUBRICANT

(75) Inventors: Mary-Jo Liston, Whitmore Lake, MI (US); John Miller, Jackson, MI (US); Randall King, Kingwood, TX (US)

(73) Assignee: NTN Corporation, Osaka (JP)

( * ) Notice: Subject to any disclaimer, the term of this patent is extended or adjusted under 35 U.S.C. 154(b) by 8 days.

(21) Appl. No.: 10/381,775

(22) PCT Filed: May 31, 2001

(86) PCT No.: PCT/US01/17430
§ 371 (c)(1),
(2), (4) Date: Jul. 24, 2003

(87) PCT Pub. No.: WO01/92741
PCT Pub. Date: Dec. 6, 2001

(65) Prior Publication Data
US 2004/0035670 A1 Feb. 26, 2004

Related U.S. Application Data

(60) Provisional application No. 60/208,244, filed on May 31, 2000.

(51) Int. Cl.[7] ............................................. F16D 41/20
(52) U.S. Cl. .............................. 192/41 S; 192/113.32
(58) Field of Search ..................... 192/41 S, 113.32; 474/74, 171

(56) References Cited

U.S. PATENT DOCUMENTS

| | | | | |
|---|---|---|---|---|
| 5,059,336 A | * | 10/1991 | Naka et al. .................. 508/310 |
| 5,462,684 A | * | 10/1995 | Naka et al. .................. 508/485 |
| 5,498,357 A | * | 3/1996 | Naka et al. .................. 508/176 |
| 5,598,913 A | * | 2/1997 | Monahan et al. .......... 192/41 S |
| 5,675,202 A | * | 10/1997 | Zenmei et al. ......... 192/113.32 |
| 5,840,666 A | * | 11/1998 | Yokouchi et al. ........... 508/291 |
| 6,103,673 A | * | 8/2000 | Sumiejski et al. .......... 508/186 |
| 6,136,762 A | * | 10/2000 | Yoshinari et al. ........... 508/552 |
| 6,279,708 B1 | * | 8/2001 | Yatabe et al. .............. 192/45.1 |
| 6,343,682 B1 | * | 2/2002 | Terada et al. .......... 192/113.32 |
| 2003/0040442 A1 | * | 2/2003 | Yokouchi et al. ........... 508/155 |

FOREIGN PATENT DOCUMENTS

JP   8-128452 A   *   5/1996
JP   9-119509 A   *   5/1997

* cited by examiner

*Primary Examiner*—Rodney H. Bonck
(74) *Attorney, Agent, or Firm*—Brinks Hofer Gilson & Lione

(57) ABSTRACT

The over-running clutch pulley of a preferred embodiment of the invention includes a sheave member (20), a hub member (22) located substantially concentrically within the sheave member, a clutch member (24), a clutch lubricant (26) located near the clutch member, a bearing member (28) located between the sheave member and the hub member, and a bearing lubricant (30) located near the bearing member, which cooperate to rotationally engage an input device (12) and an output device (14). The sheave member preferably includes a sheave input section (32) adapted to engage the input device, and a sheave clutch section (34) defining a sheave clutch surface (36). Similarly, the hub member preferably includes a hub output section (38) adapted to engage the output device, and a hub clutch section (40) defining a hub clutch surface (42). The clutch lubricant (26) and the bearing lubricant (30) preferably include a base material selected from the group comprising ether, esther, and mineral oil.

14 Claims, 1 Drawing Sheet

OVER-RUNNING CLUTCH PULLEY WITH CLUTCH AND BEARING LUBRICANT

CROSS-REFERENCE TO RELATED APPLICATIONS

The present application is a U.S. national phase application of international application No. PCT/US01/17430, filed May 31, 2001, which claims the benefit of provisional application No. 60/208,244, filed May 31, 2000.

TECHNICAL FIELD

This invention relates generally to devices in the over-running clutch field, and more specifically to an improved over-running clutch pulley for use with an accessory device driven by an automotive engine with a belt drive.

BACKGROUND

During the operation of an automotive engine, a drive belt is typically used to power and operate various accessory devices. One of these accessory devices is typically an automotive alternator, which provides electrical power to the automobile. While several arrangements of drive belts are in use, the serpentine arrangement, which drives several accessory devices, is currently most favored. Serpentine arrangements typically include a drive pulley connected to the crankshaft of the engine (the "output device") and a drive belt trained about the drive pulley. The drive belt is also trained about one or more conventional driven pulleys, which are connected to the input shafts of various accessories devices (the "input device").

Most conventional driven pulleys are made from a one-piece design with no over-running capabilities. In other words, the conventional driven pulleys are rigidly mounted to the input shaft and are incapable of allowing relative rotational movement between any section of the driven pulley and the input shaft. As a result of the lack of any over-running capabilities and of the generation of significant inertia by the accessory, relative slippage between the drive belt and the driven pulley may occur if the drive belt suddenly decelerates relative to the input shaft. The relative slippage may cause an audible squeal, which is annoying from an auditory standpoint, and an undue wear on the drive belt, which is undesirable from a mechanical standpoint.

In a typical driving situation, the drive belt may experience many instances of sudden deceleration relative to the input shaft. This situation may occur, for example, during a typical shift from first gear to second gear under wide open throttle acceleration. This situation is worsened if the throttle is closed or "back off" immediately after the shift. In these situations, the drive belt decelerates very quickly while the driven pulley, with the high inertia from the accessory device, maintains a high rotational speed, despite the friction between the drive belt and the driven pulley.

In addition to the instances of sudden deceleration, the drive belt may experiences other situations that cause audible vibration and undue wear. As an example, a serpentine arrangement with conventional driven pulleys may be used with an automobile engine that has an extremely low idle engine speed (which may increase fuel economy). In these situations, the arrangement typically experiences "belt flap" of the drive belt as the periodic cylinder firing of the automotive engine causes the arrangement to resonate within a natural frequency and cause an audible vibration and an undue wear on the drive belt.

The disadvantage of the conventional driven pulleys, namely the audible squeal, the undue wear, and the vibration of the drive belt, may be avoided by the use of an over-running clutch pulley instead of the conventional driven pulley. An over-running clutch pulley allows the pulley to continue to rotate at the same rotational speed and in a same rotational direction after a sudden deceleration of the drive belt. In a way, the over-running clutch pulley functions like the rear hub of a typical bicycle; the rear hub and rear wheel of a conventional bicycle continue to rotate at the same rotational speed and in the same rotational direction even after a sudden deceleration of the pedals and crankshaft of the bicycle. An example of an over-running clutch pulley is described in U.S. Pat. No. 5,598,913 issued to the same assignee of this invention and hereby incorporated in its entirety by this reference.

Since many customers of new automobiles are demanding longer lives, with relatively fewer repairs, for their new automobiles, there is a need in the automotive field, if not in other fields, to create an over-running clutch pulley with increased wear resistance. This invention provides an over-running clutch pulley with features intended to increase wear resistance, while minimizing the costs and weight of the over-running clutch pulley.

DETAILED DESCRIPTION OF THE PREFERRED EMBODIMENT

The following description of the preferred embodiment of the invention is not intended to limit the scope of this invention to this preferred embodiment, but rather to enable any person skilled in the art of over-running clutches to make and use this invention.

Figure 1:
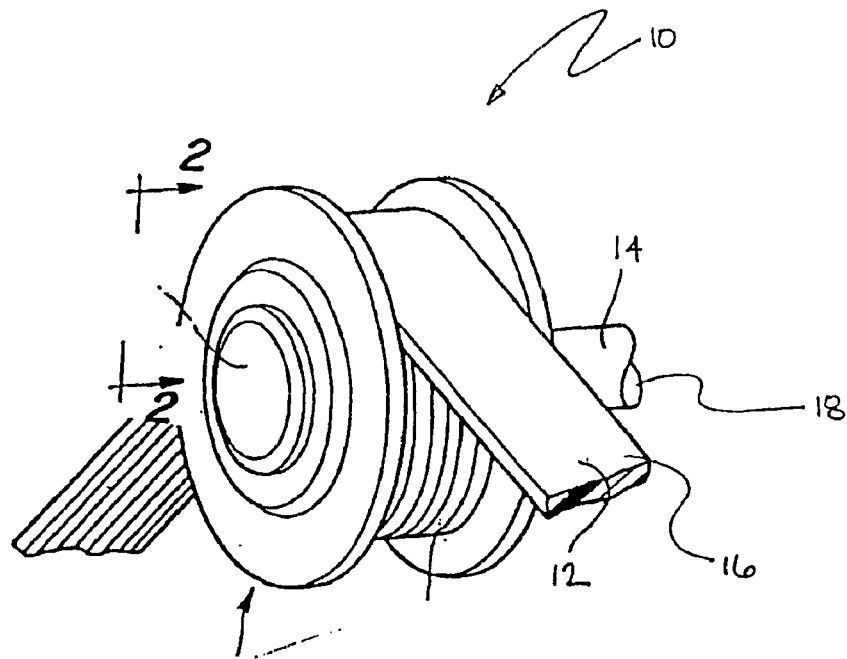
FIG. 1 is a perspective view of an over-running clutch pulley of the invention, shown with a drive belt as the input device and a cylindrical shaft as the output device.

As shown in FIG. 1, the invention includes an over-running clutch pulley 10 for rotationally engaging an input device 12 and an output device 14. The over-running clutch pulley 10 has been designed for use with a drive belt 16 as the input device 12, and with a cylindrical shaft 18 as the output device 14. More specifically, the over-running clutch pulley 10 has been particularly designed for use with a drive belt 16 with a grooved surface and a cylindrical shaft 18 of an automotive alternator. The over-running clutch pulley 10 may be used, however, in other environments, with other suitable input devices, such as smooth belt, a toothed belt, a V-shaped belt, or even a toothed gear, and with other suitable output devices, such as a polygonal shaft. Furthermore, the over-running clutch pulley 10 may be used in an environment with two devices that alternate their rotational input responsibilities, and in an environment with an "output device" that actually provides rotational input and with an "input device" that actually receives rotational input. In these alternative embodiments, the terms "input device" and "output device" are interchangeable.

Figure 2:
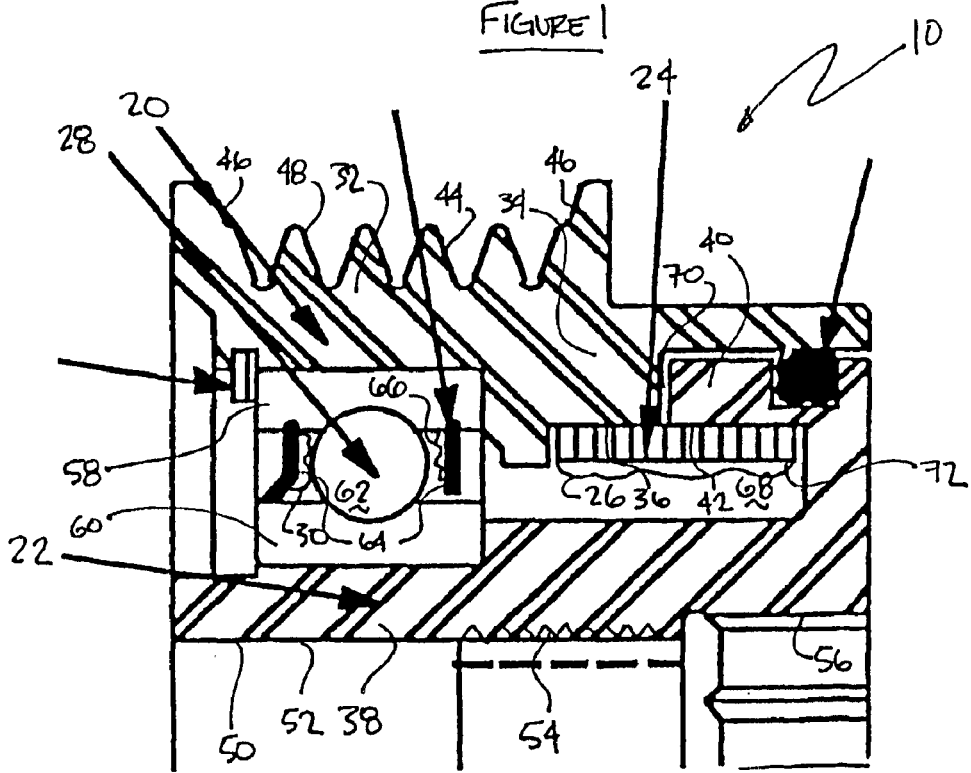
FIG. 2 is a partial cross-section view, taken along the line 2—2 of FIG. 1 of the over-running clutch pulley of the preferred embodiment.

As shown in FIG. 2, the over-running clutch pulley 10 of the preferred embodiment includes a sheave member 20, a hub member 22 located substantially concentrically within the sheave member 20, a clutch member 24, a clutch lubricant 26 located near the clutch member 24, a bearing member 28 located between the sheave member 20 and the hub member 22, and a bearing lubricant 30 located near the bearing member 28, which cooperate to rotationally engage the drive belt and the cylindrical shaft. The sheave member 20 preferably includes a sheave input section 32 adapted to engage the input device, and a sheave clutch section 34 defining a sheave clutch surface 36. Similarly, the hub member 22 preferably includes a hub output section 38 adapted to engage the output device, and a hub clutch section 40 defining a hub clutch surface 42. In the preferred embodiment, the clutch lubricant 26 and the bearing lubricant 30 preferably include a base material selected from the group comprising ether, ester, and mineral oil, which increases wear resistance for the over-running clutch pulley 10, while minimizing cost and weight. The over-running clutch pulley of alternative embodiments may include other elements, such as a sealing member to substantially prevent passage of dirt into and lubricant out of the over-running clutch pulley, or any other suitable elements that do not substantially interfere with the functions of the sheave member 20, the hub member 22, and the clutch member 24.

The sheave input section 32 of the sheave member 20 of the preferred embodiment functions to engage the drive belt. To substantially prevent rotational and axial slippage of the sheave member 20 and the drive belt, the sheave input section 32 preferably defines a sheave input surface 44 with two sheave input shoulders 46 and at least one sheave input groove 48. The sheave input section 32 may alternatively define other suitable surfaces, such as toothed surfaces or ribbed surfaces, to engage the input device. The sheave input surface 44 is preferably outwardly directed (away from the rotational axis of the over-running clutch pulley 10) and is preferably substantially cylindrically shaped. The sheave input section 32 is preferably made from conventional structural materials, such as steel, and with conventional methods, but may alternatively be made from other suitable materials and from other suitable methods.

The hub output section 38 of the hub member 22 of the preferred embodiment functions to engage the cylindrical shaft. The hub output section 38 preferably defines a hub output surface 50 with a smooth section 52 (which functions to ease and center the assembly of the over-running clutch pulley 10 onto the cylindrical shaft), a threaded section 54 (which functions to substantially prevent rotation and to axially retain the hub member 22 to the cylindrical shaft), and a hexagonal section 56 (which functions to mate with an allen wrench for easy tightening and loosening of the over-running clutch pulley 10 onto and off of the cylindrical shaft). Of course, the hub output section 38 may include other suitable devices or define other surfaces to prevent rotational and axial slippage, to engage the cylindrical shaft, and to engage a tool for tightening or loosening the over-running clutch pulley 10 onto and off of the cylindrical shaft. The hub output surface 50 is preferably inwardly directed (toward the rotational axis of the over-running clutch pulley 10) and is preferably substantially cylindrically shaped. The hub output section 38 is preferably made from conventional structural materials, such as steel, and with conventional methods, but may alternatively be made from other suitable materials and from other suitable methods.

The bearing member 28 of the preferred embodiment functions to allow relative rotational movement of the sheave member 20 and the hub member 22. The bearing member 28, which is preferably a rolling element type, preferably includes an outer race element 58 preferably press-fit mounted on the sheave member 20, an inner race element 60 preferably press-fit mounted on the hub member 22, ball bearing elements 62 preferably located between the outer race element 58 and the inner race element 60, and bearing seals 64 preferably extending between the outer race element 58 and the inner race element 60 on either side of the ball bearing elements 62. The outer race element 58, the inner race element 60, and the bearing seals 64 cooperate to define a bearing free volume 66 surrounding the ball bearing elements 62. The bearing member 28 may alternatively be of other suitable types, such as a journal bearing or a roller bearing, may alternatively include other suitable elements, and may alternatively be mounted in other suitable manners. The bearing member 28 is a conventional device and, as such, is preferably made from conventional materials and with conventional methods, but may alternatively be made from other suitable materials and with other suitable methods.

The sheave clutch section 34 and the hub clutch section 40 of the preferred embodiment function to provide the sheave clutch surface 36 and the hub clutch surface 42, respectively, for the engagement with the clutch member 24. The sheave clutch section 34 preferably extends radially inward from the sheave member 20. In this manner, the sheave clutch section 34 is preferably made from the same material and with the same methods as the sheave input section 32, but may alternatively be made from other suitable materials and with other suitable methods. The hub clutch section 40 preferably extends radially outward from and axially over the hub output section 38. In this manner, the hub clutch section 40 is preferably made from the same material and with the same methods as the hub output section 38, but may alternatively be made from other suitable materials and with other suitable methods. The sheave clutch surface 36 and the hub clutch surface 42 cooperate to define a clutch free volume 68 surrounding the clutch member 24.

In the preferred embodiment, the sheave clutch surface 36 and the hub clutch surface 42 are located substantially adjacent with an axial gap 70 between each other. The sheave clutch surface 36 and the hub clutch surface 42 are preferably inwardly directed (toward the rotational axis of the over-running clutch pulley 10) and are preferably substantially cylindrically shaped. Furthermore, the sheave clutch surface 36 and the hub clutch surface 42 preferably have a similar radial diameter, a similar axial length, and a similar smooth finish. These features allow optimum performance of the clutch member 24. The sheave clutch surface 36 and the hub clutch surface 42 may alternatively have differences with each other on these, or other, design specifications.

The clutch member 24 of the preferred embodiment functions to engage the sheave clutch surface 36 and the hub clutch surface 42 upon the acceleration of the sheave member 20 in a first rotational direction relative to the hub member 22, and to disengage the sheave clutch surface 36 and the hub clutch surface 42 upon the deceleration of the sheave member 20 in the first rotational direction relative to the hub member 22. In the preferred embodiment, the clutch member 24 is a coil spring 72. The coil spring 72, which is made from conventional materials and with conventional methods, accomplishes the above features by the particular size and orientation of the coil spring 72. In alternative embodiments, the clutch member 24 may include other suitable devices that accomplish the above features.

The coil spring 72 is preferably designed with a relaxed spring radial diameter that is sized slightly greater than an inner diameter of the sheave clutch surface 36 and the hub clutch surface 42. Thus, when experiencing no rotational movement of the sheave member 20 or the hub member 22, the coil spring 72 frictionally engages with and exerts an outward force on both the sheave clutch surface 36 and the hub clutch surface 42. Further, the coil spring 72 is preferably oriented within the clutch free volume 68 such that the coils extend axially in the first rotational direction from the sheave clutch surface 36 to the hub clutch surface 42. With this orientation, relative rotational movement of the sheave member 20 and the hub member 22 will result in an unwinding or winding of the spring member. In other words, acceleration of the sheave member 20 in the first rotational direction relative to the hub member 22 will bias an unwinding of the coil spring 72 and deceleration of the sheave member 20 in the first rotational direction relative to the hub member 22 will bias a winding of the coil spring 72.

The unwinding of the coil spring 72 tends to increase the outward force of the coil spring 72 on the sheave clutch surface 36 and the hub clutch surface 42, thereby providing engagement, or "lock", of the sheave member 20 and the hub member 22. This engagement condition preferably occurs upon the acceleration of the sheave member 20 in the first rotational direction relative to the hub member 22. On the other hand, the winding of the coil spring 72 tends to decrease the outward force of the coil spring 72 on the sheave clutch surface 36 and the hub clutch surface 42, thereby allowing disengagement, or "slip", of the sheave member 20 and the hub member 22. This disengagement condition preferably occurs upon the deceleration of the sheave member 20 in the first rotational direction relative to the hub member 22.

During the "slip" condition of the over-running clutch pulley 10, the coil spring 72 will lightly rub across the sheave clutch surface 36 or the hub clutch surface 42, which may generate heat and may cause wear of these surfaces. Because of the heat generation within the over-running clutch pulley, the bearing lubricant 30 and the clutch lubricant 26 are preferably thermally stable, and avoid thermal instability, at a temperature up to about 150° C. Further, because of the surface wear possibility, the clutch lubricant 26 preferably provides a coefficient of friction between the clutch member 24 and the sheave clutch surface 36 and between the clutch member 24 and the hub clutch surface 42 greater than about 0.05 and less than about 0.25. More preferably, the clutch lubricant 26 provides a coefficient of friction between the clutch member 24 and the sheave clutch surface 36 and between the clutch member 24 and the hub clutch surface 42 of about 0.1.

In the preferred embodiment, the clutch lubricant 26 and the bearing lubricant 30 include the base material and a thickening material. The base material is preferably approximately 25% to approximately 75% by weight of the clutch lubricant 26 and of the bearing lubricant 30, while the thickening material is preferably the remaining percentage. The clutch lubricant 26 and the bearing lubricant 30 may alternatively include other suitable materials, such as an additional compatible base material or an additional compatible thickening material. These additional materials are preferably less than approximately 5% by weight of the clutch lubricant 26 and of the bearing lubricant 30, but may alternatively be more than this preferred percentage.

The thickening material, which functions to thicken the clutch lubricant 26 and the bearing lubricant 30, is preferably selected from the group comprising a urea thickening material, a sodium thickening material, and a lithium thickening material. Although the clutch lubricant 26 and the bearing lubricant 30 could include any combination of the three preferred base materials and the three preferred thickening materials, the clutch lubricant 26 and the bearing lubricant 30 of the preferred embodiment include a preferred combination of: (1) the ether base material and the urea thickening material; (2) the ester base material and the sodium thickening material or the lithium thickening material; or (3) the mineral oil base material and the urea thickening material.

In the preferred embodiment, the clutch lubricant 26 and the hub lubricant include the same base material and the same thickening material. This feature is intended to minimize the cost of the over-running clutch pulley 10. In variations of the preferred embodiment, the bearing member 28 may omit the inboard bearing seal 64 and the bearing lubricant 30 and the clutch lubricant 26 may fuse within the over-running clutch pulley 10 to form a unitary pulley lubricant, which may further minimize the cost of the over-running clutch pulley 10. In alternative embodiments, the clutch lubricant 26 and the bearing lubricant 30 may include different base materials and the same thickening material, the same base material and different thickening materials, or different base materials and different thickening materials.

In the preferred embodiment, the clutch lubricant 26 occupies from approximately 50% to approximately 90% of the clutch free volume 68, and the bearing lubricant 30 occupies from approximately 20% to approximately 45% of the bearing free volume 66. In alternative embodiments, the clutch lubricant 26 may occupy more or less than the preferred percentage, and the bearing lubricant 30 may occupy more or less than the preferred percentage.

As any person skilled in the art of over-running clutches will recognize from the previous detailed description and from the figures and claims, modifications and changes can be made to the preferred embodiment of the invention without departing from the scope of this invention defined in the following claims.

We claim:

1. An over-running clutch pulley for rotationally engaging an input device and an output device, comprising:

a sheave member including a sheave input section adapted to the engage the input device, and a sheave clutch section defining a shave clutch surface;

a hub member located substantially concentrically within said sheave member and including a hub output section adapted to engage the output device, and a hub clutch section defining a hub clutch surface substantially adjacent said sheave clutch surface, said sheave clutch surface and said hub surface being inwardly directed and cylindrically shaped;

a wrap spring clutch member adapted to engage said sheave clutch surface and said hub clutch surface upon the acceleration of said sheave member in a first rotational direction relative to said hub member, and to disengage said sheave clutch surface and said hub clutch surface upon the deceleration of said sheave member in the first rotational direction relative to said hub member;

said sheave clutch surface, said hub clutch surface and said hub output cooperating to define a clutch free volume located radially inward of said wrap spring clutch member;

a clutch lubricant located near said wrap spring clutch member and including a base material selected from the group comprising ether, ester, and mineral oil;

a bearing member located between said sheave member and said hub member, and adopted to allow relative rotations movement or said sheave member and said hub member; and a bearing lubricant located near said bearing member and including a base material selected from the group comprising ether, ester, and mineral oil.

2. The over-running clutch of claim 1 wherein said clutch lubricant and said bearing lubricant include the same base material.

3. The over-running clutch pulley of claim 2 wherein said clutch lubricant and said bearing lubricant include an ether base material.

4. The over-running clutch pulley of claim 3 wherein said clutch lubricant and said bearing lubricant also include a urea thickening material.

5. The over-running clutch pulley of claim 2 wherein said clutch lubricant and said bearing lubricant Include an ester baa, material.

6. The over-running clutch pulley of claim 5 wherein said clutch lubricant and said bearing lubricant also include a sodium thickening material.

7. The over-running clutch pulley of claim 5 wherein said clutch lubricant and said bearing lubricant also include a lithlum thickening material.

8. The over-running clutch pulley of claim 2 wherein said clutch lubricant and said bearing lubricant include a mineral oil base material.

9. The over-running clutch pulley of claim 8 wherein said clutch lubricant and said bearing lubricant also include a urea thickening material.

10. The over-running clutch pulley of claim 1 wherein said bearing member defines a bearing free volume; and wherein said bearing lubricant occupies from approximately 20% to approximately 45% of said bearing free volume.

11. The over-running clutch pulley of claim 1 wherein said clutch lubricant occupies from approximately 50% to approximately 90% of said clutch free volume.

12. The over-running clutch pulley of claim 1 wherein said clutch lubricant provides a coefficient of friction between said wrap spring clutch member and said sheave clutch surface and between said wrap spring clutch member and said hub clutch surface of about 0.1.

13. The over-running clutch pulley of claim 1 wherein said bearing lubricant and said clutch lubricant are both adapted to substantially avoid thermal instability at a temperature up to about 150° C.

14. The over-running clutch pulley of claim 1 wherein said bearing lubricant and said clutch lubricant communicate within said over-running clutch pulley to form a unitary pulley lubricant.

* * * * *

UNITED STATES PATENT AND TRADEMARK OFFICE
CERTIFICATE OF CORRECTION

PATENT NO. : 6,923,303 B2  
DATED : August 2, 2005  
INVENTOR(S) : Mary-Jo Liston et al.

It is certified that error appears in the above-identified patent and that said Letters Patent is hereby corrected as shown below:

Column 6,  
Line 4, before "engage the input device," delete "the".

Column 7,  
Line 3, before "material." delete "baa, and substitute -- base --.  
Line 3, before "thickening material." delete "lithlum" and substitute -- lithium --.

Signed and Sealed this

Thirtieth Day of May, 2006

JON W. DUDAS  
*Director of the United States Patent and Trademark Office*